US007073182B1

(12) United States Patent
Osburn, III (10) Patent No.: US 7,073,182 B1
(45) Date of Patent: Jul. 4, 2006

(54) OPCMESSENGER

(76) Inventor: Douglas C. Osburn, III, 936 Plantation St., League City, TX (US) 77573

( * ) Notice: Subject to any disclaimer, the term of this patent is extended or adjusted under 35 U.S.C. 154(b) by 719 days.

(21) Appl. No.: 10/177,711

(22) Filed: Jun. 21, 2002

(51) Int. Cl.
*G06F 3/00* (2006.01)
*G06F 9/44* (2006.01)
*G06F 9/46* (2006.01)
*G06F 13/00* (2006.01)

(52) U.S. Cl. ............... 719/328; 719/316; 700/272

(58) Field of Classification Search ........... 719/310, 719/311–332; 700/1, 2, 21–32, 266, 272, 700/275
See application file for complete search history.

(56) References Cited

U.S. PATENT DOCUMENTS

| | | | |
|---|---|---|---|
| 6,285,966 B1 * | 9/2001 | Brown et al. | 702/188 |
| 6,505,247 B1 * | 1/2003 | Steger et al. | 709/224 |
| 2002/0198943 A1 * | 12/2002 | Zhuang et al. | 709/206 |

OTHER PUBLICATIONS

AutoSol, AutoSol's OPCMessenger White Paper.*

* cited by examiner

*Primary Examiner*—William Thomson
*Assistant Examiner*—Diem Cao
(74) *Attorney, Agent, or Firm*—Buskop Law Group, P.C.; Wendy Buskop (57) ABSTRACT

A connector software that connects on-line interfaces used in automation systems with transaction processing for distribution of data over a global communication network comprising a configurable connector software running on memory in a computer, a configurable connector software server interface adapted to receive at least one client request from at least one client application for data and sending the data in a server response to those requests, a configurable connector software client interface adapted to issue at least one client request to at least one server application for data and for receiving the data in a server response to those requests, configurable connector software publishing interface adapted to send data to a message queue, configurable connector software subscriber interface adapted to receive data from the message queue, and wherein the message queue for the configurable connector software subscriber interface is a different message queue than the configurable connector software publishing interface.

37 Claims, 9 Drawing Sheets

OPCMESSENGER

FIELD OF THE INVENTION

The present invention relates to the distribution of data from automation systems used in the refining, petrochemical, chemical processing, power generation, gas distribution, oil and gas pipelines, wastewater collection, water distribution and environmental monitoring industries to interested parties or to software applications running on remote computer systems connected by a network.

The invention relates to data processing software and hardware that bridges automation communication standards which require that components be in continuous operation and connection to assure data delivery, with disconnected transaction processing standards from the Information Technology field, to provide a data delivery model that is more suited for extended networks such as the Internet.

BACKGROUND OF THE INVENTION

Automation systems are traditionally designed to collect data from control and monitoring hardware, which is located near an industrial plant, process, or machine, and to concentrate the data at a control center. The traditional communication model has been to focus data from many sources for delivery to a few locations and recipients. At the control center, the information collected is continuously monitored by personnel and computer systems for appropriate operation of the field assets. To insure data delivery to the data center, the software and hardware components used in these systems must be operating and continuously connected by a network. Many users have implemented expensive and vast private networks to further insure the secure, reliable and timely delivery of data from field devices to the data center. The cost of these measures however, was deemed justified as the communication of conditions and circumstances in the field are vital to the safe and profitable operation of the industrial assets.

This approach however, is not adequate for the delivery of data to a large number of sites and recipients, does not reliably support the use of public networks that can reduce costs, and cannot insure the delivery of data to systems or users that may be intermittently connected to the network.

OPC (OLE for Process Control) is an interface standard that is commonly used to exchange data between industrial automation software programs. In this standard OPC Client application requests information from an OPC Server application, which processes the requests and serves up data to the client in response. A key consideration with regard to this architecture is that the Client and the Server must be active at the same time for data exchange to occur. In addition, OPC does not have means to compensate for communication latencies that can occur in wide area networks, does not provide for clients or servers intermittently connected to the network, and OPC data cannot be transferred over the Internet as it is usually blocked at corporate firewalls. The latter is because all TCP/IP ports except Port 80, which allows only textual data, are usually blocked at corporate firewalls. OPC however, is based on a Microsoft standard for component communication, DCOM (Distributed Component Object Model) that is not textual.

JMS (Java Messaging Service) is a messaging standard for disconnected transaction processing, which is commonly necessary in IT (Information Technology) applications. In this technology a computer system publishes data in the form of JMS messages to a message broker over a network. Subsequently, subscriber systems receive the latest data in the form of JMS messaging, from the message broker over the network. A key characteristic of this technology is that the publishing system and the subscriber system do not have to be connected to the message broker at the same time for the transaction to be completed. Additionally, JMS messaging is an appropriate method for the distribution of data over the Internet as the payload of the messages can be in the form of XML (Extensible Markup Language) which is text and which can pass through Port 80 in corporate firewalls.

The OPCMessenger is software that provides a bi-directional OPC to JMS bridge to:

a. Distribute data from automation systems to large numbers of users or applications over a network (The OPCMessenger enables a many sources to many recipients model.), b. Insure delivery of data between automation systems and users or applications that may be intermittently connected to a network, c. Collect and distribute data with secure and reliable delivery over public networks such as the Internet, and d. Reliably deliver data between automation systems that may be widely separated and which may be connected by networks that may experience long latencies and service interruptions.

None of these capabilities has been economically possible through traditional industrial automation technologies, standards, protocols, or practices.

SUMMARY OF THE INVENTION

A connector software that connects on-line interfaces used in automation systems with transaction processing for distribution of data over a global communication network comprising:

a. Configurable connector software running on memory in a computer:

b. Configurable connector software server interface adapted to receive at least one client request from at least one client application for data and sending the data in a server response to those requests;

c. Configurable connector software client interface adapted to issue at least one client request to at least one server application for data and for receiving the data in a server response to those requests;

d. Configurable connector software publishing interface adapted to send data to a message queue; and e. Configurable connector software subscriber interface adapted to receive data from the message queue, and wherein the message queue for the configurable connector software subscriber interface is a different message queue than the configurable connector software-publishing interface.

BRIEF DESCRIPTION OF THE FIGURES

The following detailed description of the preferred embodiment is better understood when read in conjunction with the appended drawings. For the purpose of illustrating the invention, there is shown in the drawings an embodiment that is presently preferred, it being understood, however, that the invention is not limited to the specific methods disclosed.

DETAILED DESCRIPTION OF THE EMBODIMENTS

According to a presently preferred embodiment of the invention, a system and method for acquisition and distribution of data over a network will now be described with reference to the Figures of the drawings. It will be appreciated by those of ordinary skill in the art that the description given herein with respect to those Figures is for exemplary purposes only and is not intended in any way to limit the scope of the invention. For example, the OPCMessenger described herein as a method for bi-directionally transferring data between automation software at two remote locations is not intended as a limitation. The OPCMessenger could, for example, be used to transfer data between any number and kinds of automation systems that can be in close proximity or remote from one another. The connector software is described herein for the connection of OPC Clients and Servers to a message queue through JMS messaging. The software and techniques, however, could be used to connect any software have an interface using an on-line protocol with any software that has an interface based on transaction protocols.

Another embodiment of the invention contemplates using connector software that connects on-line interfaces used in automation systems with transaction processing for distribution of data over a global communication network comprising:

a. configurable connector software running on memory in a computer:
b. a configurable connector software server interface adapted to receive at least one client request from at least one client application for data and sending said data in a server response to those requests;
c. a configurable connector software client interface adapted to issue at least one client request to at least one server application for data and for receiving said data in a server response to those requests;
d. a configurable connector software publishing interface adapted to send data to a message queue; and
e. a configurable connector software subscriber interface adapted to receive data from said message queue and wherein the message queue for the configurable connector software subscriber interface is different message queue than the configurable connector software-publishing interface.

Figure 1:
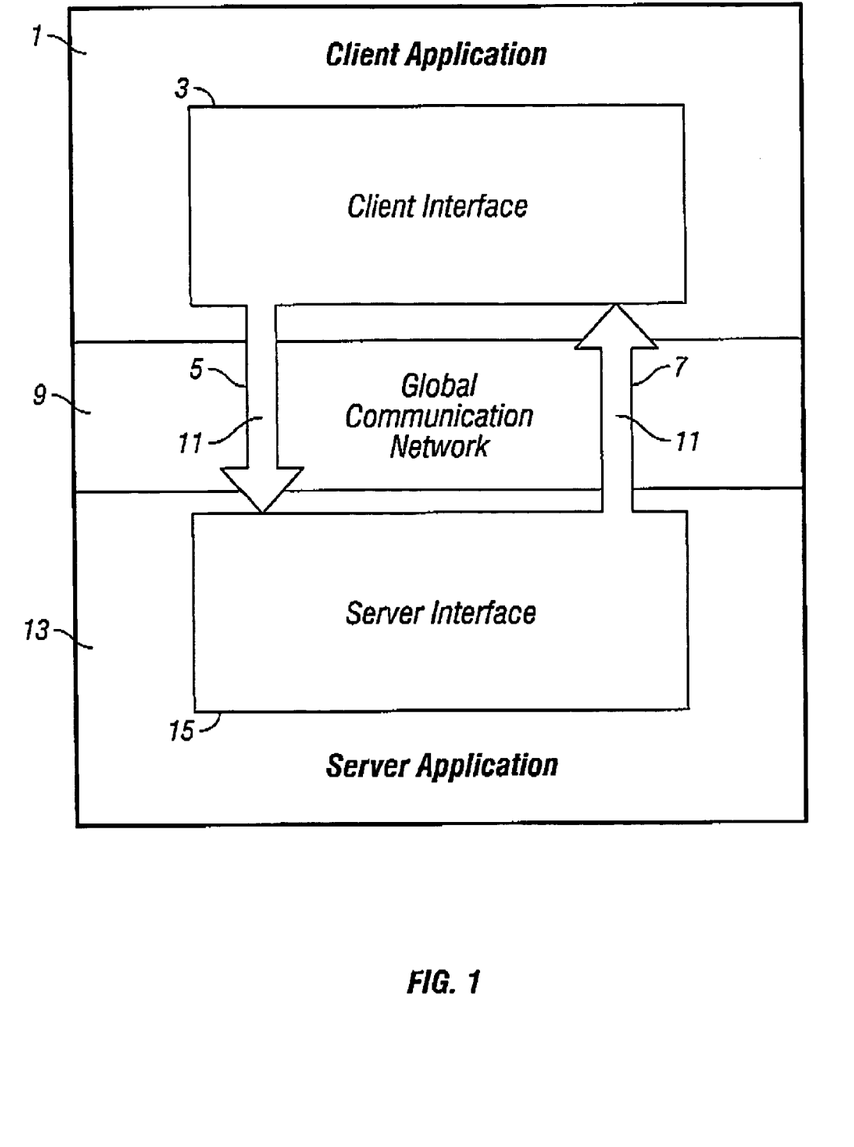
FIG. 1 shows the relationship between an OPC Client application and an OPC Server application.

Referring now to FIG. 1, there is shown the use of the OLE for Process Control (OPC) client-server protocol for transmission of data between automation systems having OPC client and OPC server interfaces. As shown, client application 1 has an client interface 3 that can transmit client request 5 requesting data from, or writing data to, a second server application 13 that has a server interface 15. In response to client request 5, server application 13 transmits server response 7 containing data 11 through server interface 15 to OPC client interface 3. Client request 5 and server response 7 are OPC messages that can be transmitted over a global communication network 9 although there are technical and practical problems that impact the success of this approach.

a. Client application 1 and server application 13 must be in operation at the same time for successful communication.
b. Most corporate network protection schemes, called firewalls, are configured to block everything except text and the OPC messaging in client request 5 and server response 7 are not text.
c. The OPC standard does not deal with the significant and transient communication latencies that can occur over a global communication network.

Figure 2:
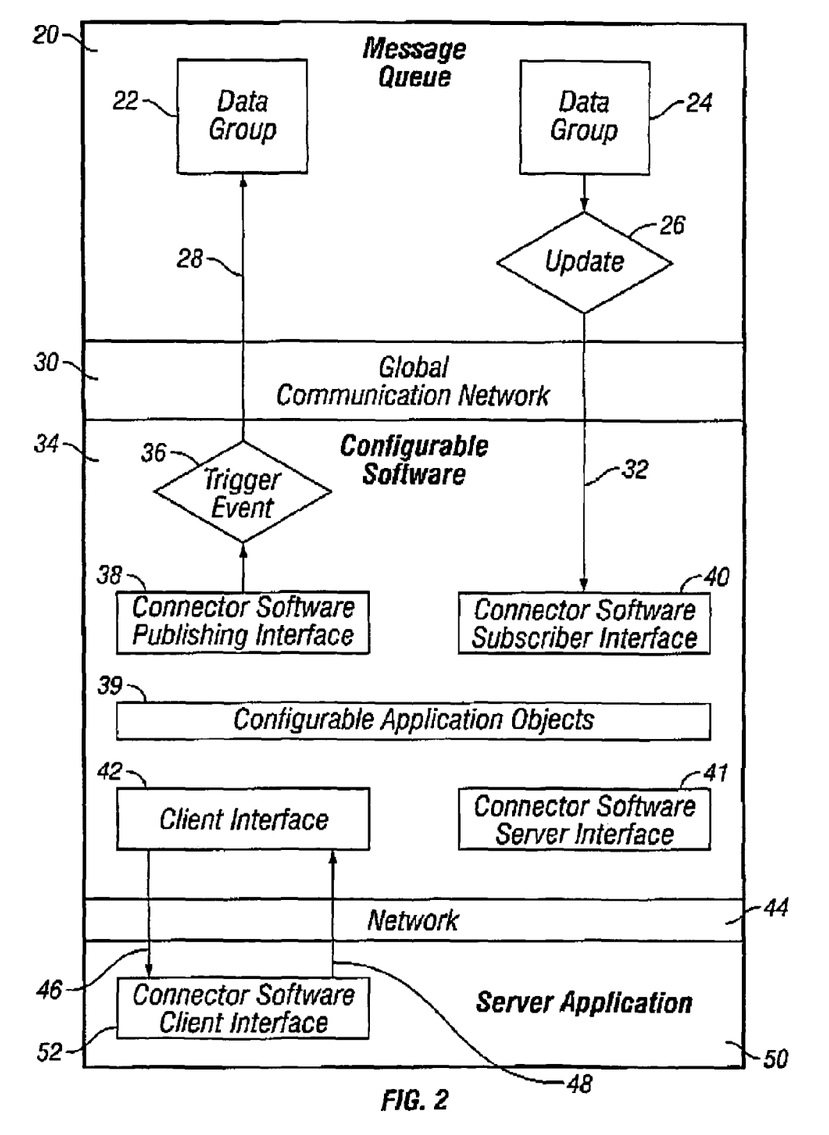
FIG. 2 details the internal data flow for the OPC Messenger

Referring to FIG. 2, there is shown a method of bi-directionally transferring data from server application 50 to message queue 20 over a global communication network 30. Configurable connector software 34 issues client request 46 through client interface 42 to server interface 52 on server application 50. Subsequently, server application 50 issues a server response through server interface 52. Configurable connector software 34 can convert this response to a publish message 28 that can be transmitted from configurable connector software publishing interface 38 on trigger event 36 to data group 22 on message queue 20. Alternatively, configurable application objects 39 in configurable software 34 can process the response prior to publish message 28 which is then transmitted from configurable connector software publishing interface 38 on trigger event 36 to data group 22 on message queue 20. In either case, the content of publish message 28 is JMS, Java Messaging Service, which can be conveyed to message queue 20 over global communication network 30.

In addition, data can be transferred from data group 24 on message queue 20 to server application 50 on update 26. Subscriber message 32 is transmitted to the configurable connector software subscriber interface 40 on configurable connector software 34. As with publish message 28, the content of subscriber message 32 is JMS, which can be conveyed over global communication network 30. Configurable connector software 34 converts subscriber message 32 for transmittal in client request 46 through the configurable connector software client interface 52. Alternatively, configurable application objects 39 on configurable connector software 34 processes subscriber message 32 prior to transmittal in client request 46 through the configurable connector software client interface 52.

Configurable connector software 34 also has configurable connector software server interface 41 that is not used in this configuration. Client request 46 and server response 48 are OPC messages, which can be conveyed between server application 50 and configurable connector software 34 when these software are on the same computer or when on two different computers connected by network 44.

Figure 3:
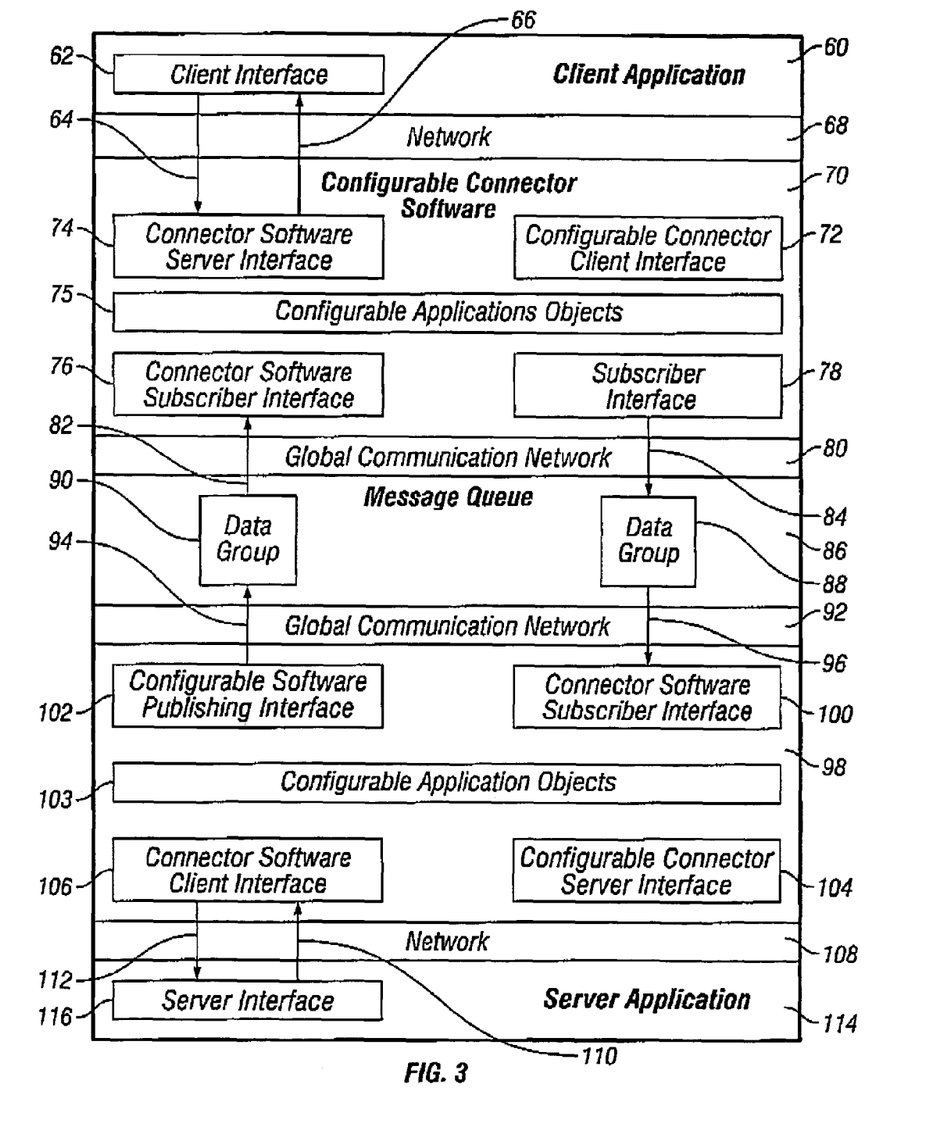
FIG. 3 details bi-directional data transfer between two applications via the OPCMessenger

Referring to FIG. 3, a bi-directional data transfer is illustrated wherein client application 60 sends client request 64 through client interface 62 over network 68 to configurable connector software server interface 74 on configurable connector software 70. Configurable connector software 70 sends server response 66 to client interface 62 on client application 60 through configurable connector software server interface 74. In addition, configurable connector software 70 converts client request 64 to publish message 84, which is sent from configurable connector software subscriber interface 78, via global communication network 80, to data group 88 on message queue 86. Alternatively, configurable applications objects 75 on configurable connector software 70 processes client request 64 prior to publish message 84, which is then sent from configurable connector software subscriber interface 78, via global communication network 80, to data group 88 on message queue 86. Subsequently, message queue 86 updates second configurable connector software 98 through subscriber message 96, which is conveyed, to configurable connector software subscriber interface 100 over global communication network 92. The second configurable connector software 98 converts subscriber message 96 to client request 112 for transmission from configurable connector software client interface 106 to server interface 116 on server application 114. Alternatively, configurable application objects 103 on the second configurable connector software 98 processes subscriber message 96 prior to client request 112 which is then transmitted from configurable connector software client interface 106 to server interface 116 on server application 114. Client request 112 and server response 110 are OPC messages that can be conveyed between server application 114 and the second configurable connector software 98 when these software are on the same computer or when on two different computers connected by network 108.

Server application 114 can respond to data coming from client application 60 through server response 110, which is sent from server interface 116 to configurable connector software client interface 106 on the second configurable connector software 98. The second configurable connector software 98 converts server response 110 to publish message 94 to be transmitted from configurable software publishing interface 102 to data group 90 on message queue 86 over global communication network 92. Alternatively, configurable application objects 103 on the second configurable connector software 98 processes server response 110 prior to publish message 94 which is then transmitted from configurable software publishing interface 102 to data group 90 on message queue 86 over global communication network 92. Subsequently configurable connector software 70 is updated by subscriber message 82 sent form data group 90 to configurable connector software subscriber interface 76. Configurable connector software 70 converts subscriber message 82 into server response 66, which is conveyed from configurable connector software server interface 74 to client interface 62 over network 68. Alternatively, configurable application objects 75 on configurable connector software 70 processes subscriber message 82 prior to server response 66, which is then conveyed from configurable connector software server interface 74 to client interface 62 over network 68.

In these applications configurable connector client interface 72 on configurable connector software 70 and configurable connector server interface 104 on the second configurable connector software 98 are available but not used.

Figure 4:
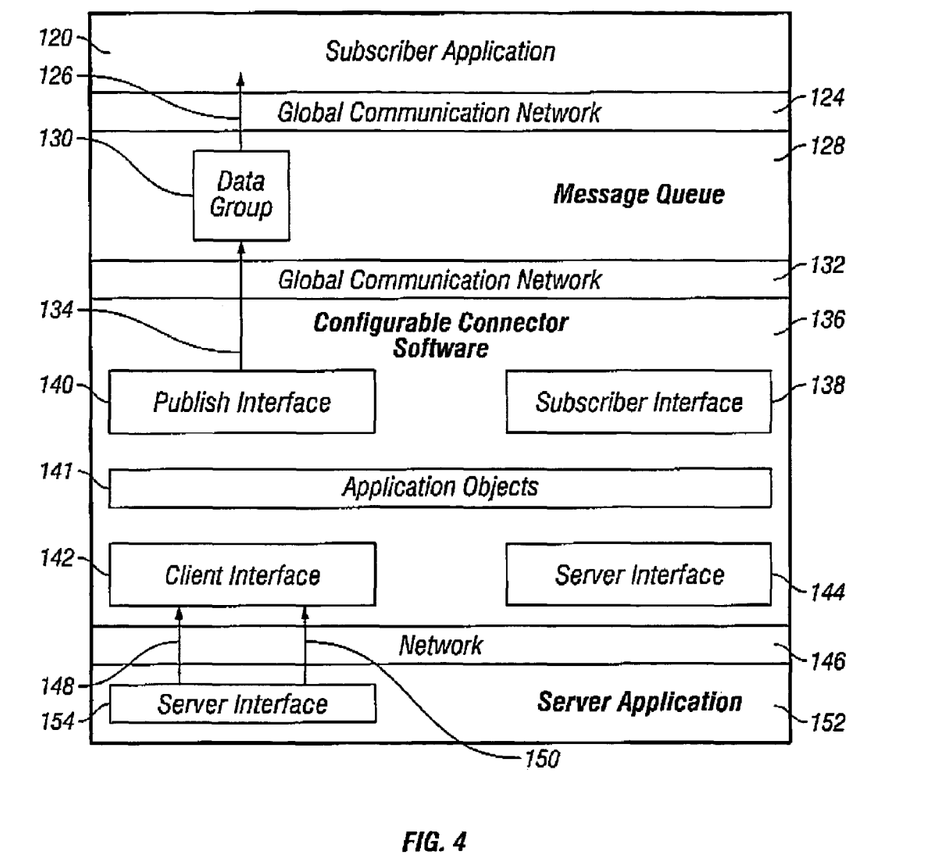
FIG. 4 shows data published to a message broker by OPCMessenger can be passed to any subscriber via JMS messaging.

Referring to FIG. 4, there is shown a schematic illustration wherein data from server application 152 is sent to one subscriber application 120 or to many subscribers. Configurable connector software 136 sends client request 148 from configurable connector software client interface 142 to server interface 154 on server application 152 over network 146. Server response 150 is sent in response to client request 148 from server interface 154 to configurable connector software client interface 142 on configurable connector software 136. Configurable connector software 136 converts server response 150 to publish message 134 that is sent from configurable connector publish interface 140 to data group 130 on message queue 128, over global communication network 132. Alternatively, configurable application objects 141 on configurable connector software 136 processes server response 150 prior to publish message 134 which is then sent from configurable connector publish interface 140 to data group 130 on message queue 128, over global communication network 132.

Subsequently, subscriber application 120 is updated by receiving subscriber message 126 that is conveyed over global communication network 124. In this application configurable connector software server interface 144 and configurable connector software subscriber interface 138 on configurable connector software 136 are available but not used.

Figure 5:
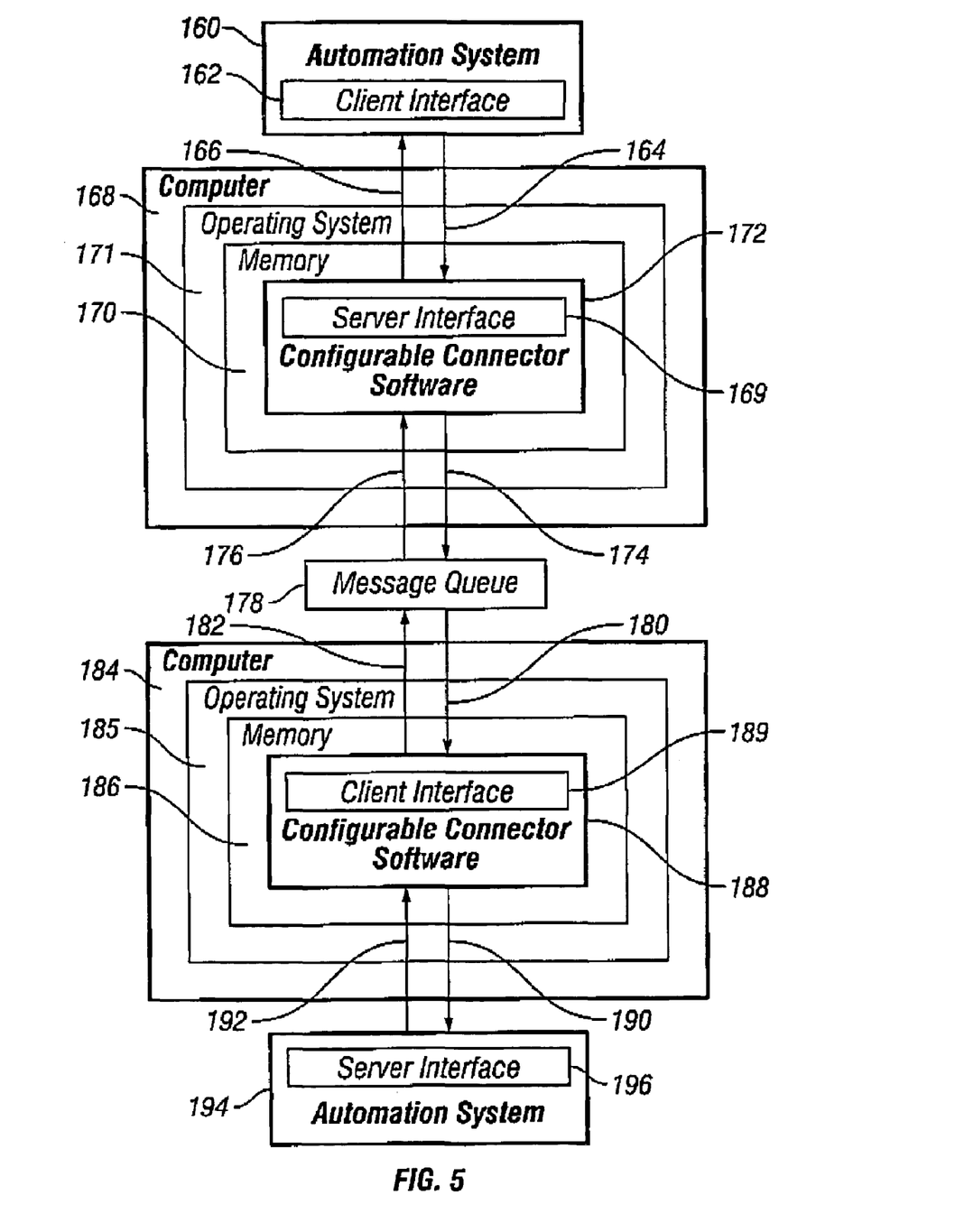
FIG. 5 shows bi-directional communication between two automation solutions through a JMS message queue.

Referring to FIG. 5, there is shown an illustration wherein data is transferred bi-directionally between automation system 160 and a second automation system 194 either of which could be a supervisory control and data acquisition (SCADA) system, a distributed control system (DCS), a controller, a data acquisition system or other automation hardware and software. Client request 164 is sent from automation system 160 to configurable connector software server interface 169 on configurable connector software 172. Configurable connector software server interface 169 sends server response 166 to client interface 162 on automation system 160 in response. Configurable connector software 172, which runs in memory 170 in a windows-based or NT-based operating system 171 on computer 168, converts client request 164 into publish message 174 which is sent to message queue 178.

A second configurable connector software 188, which runs in memory 186 in a windows-based or NT-based operating system 185 on a second computer 184, is updated by subscriber message 180 from message queue 178. The second configurable connector software 188 converts subscriber message 180 into client request 190, which is sent to a second automation system 194. The second automation system 194 sends server response 192 from its server interface 196 to configurable connector software client interface 189 on configurable connector software 188 in response. Configurable connector software 188 converts server response 192 into publish message 182 which is sent from configurable connector software 188 to message queue 178. Subsequently, Subscriber message 176 updates configurable connector software 172, which converts subscriber message 176 to server response 166. Server response 166 is then sent to client interface 162 on automation system 160.

Figure 6:
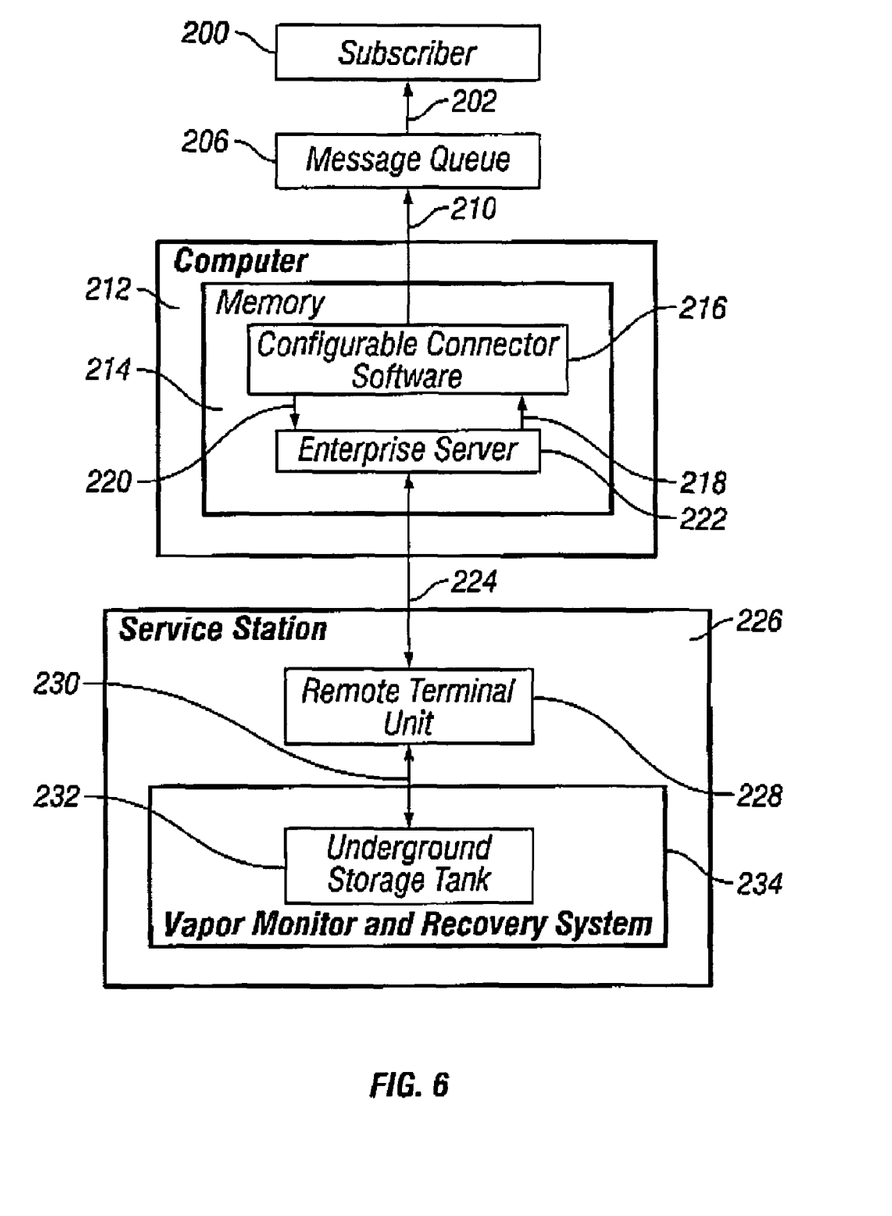
FIG. 6 details the distribution of data regarding service station underground storage tanks to subscribers through a JMS message queue.

Referring to FIG. 6, there is shown therein a schematic illustration wherein conditions associated with underground storage tank 232 in gas service station 226 are controlled and monitored by remote terminal unit 228 in vapor monitoring and recovery system 234 provided to subscriber 200. Conditions in underground storage tank are interface to remote terminal unit 228 through instrument signals 230. Remote terminal unit 228 converts instrument signals 230 for transmission via telemetry 224 to enterprise server 222 running in memory 214 on computer 212. Enterprise server 222 converts transmissions received via telemetry 224 and delivers the result to configurable connector software 216 in server response 218 in response to client request 220. Configurable connector software 216 then converts server response 218 into publish message 210 which is sent to message queue 206. Subsequently, subscriber message 202 updates subscriber 200.

Figure 7:
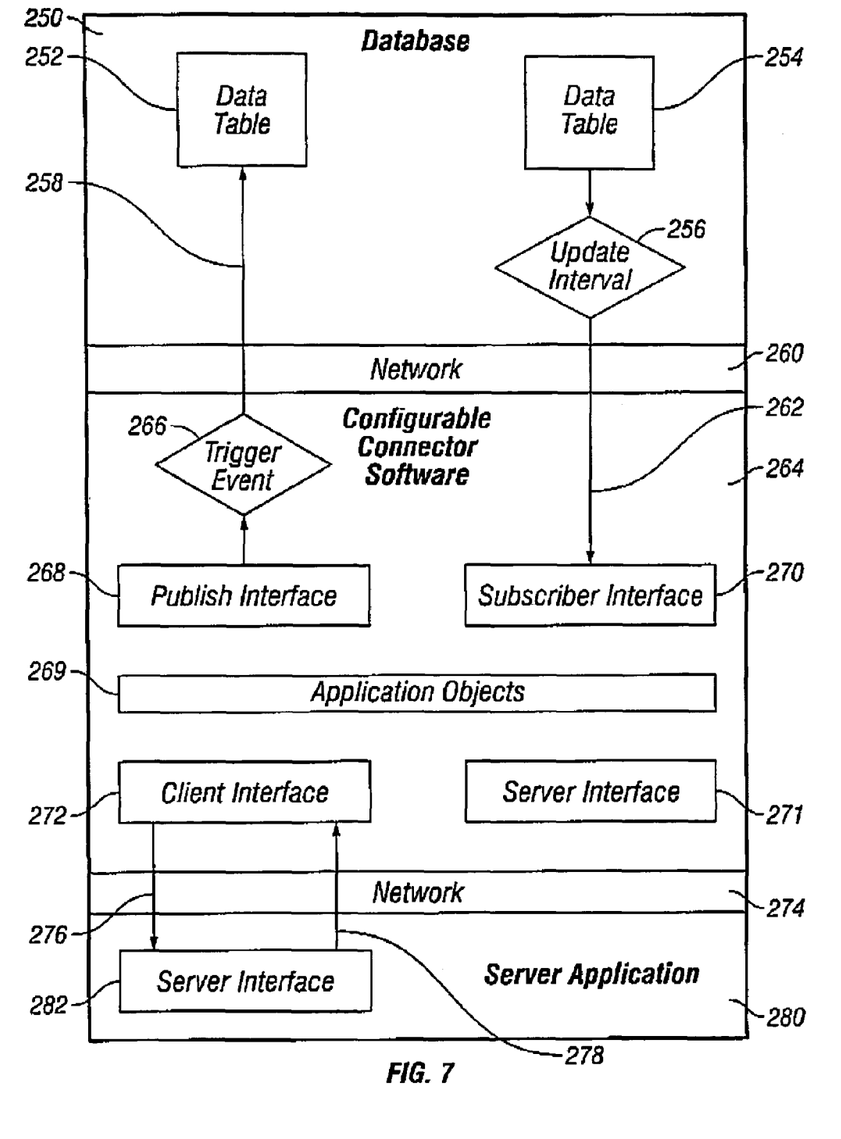
FIG. 7 shows the method of bi-directionally transferring data from server application to database over a network.

Referring to FIG. 7, there is shown a method of bi-directionally transferring data from server application 280 to database 250 over network 260. Configurable connector software 264 issues client request 276 through client interface 272 to server interface 282 on server application 280. Subsequently server application 280 issues a server response through server interface 282. Configurable connector software 264 can convert this response to a publish message 258 that can be transmitted from configurable connector software publishing interface 268 on trigger event 266 to data table 252 on database 250. Alternatively, configurable application objects 269 in configurable software 264 can process the response prior to publish message 258 which is then transmitted from configurable connector software publishing interface 268 on trigger event 266 to data table 252 on database 250.

In addition, data can be transferred from data table 254 on database 250 to server application 280 on update interval 256. Subscriber message 262 is transmitted to the configurable connector software subscriber interface 270 on configurable connector software 264. Configurable connector software 264 converts subscriber message 262 for transmittal in client request 276 through the configurable connector software client interface 282. Alternatively, configurable application objects 269 on configurable connector software 264 processes subscriber message 262 prior to transmittal in client request 276 through the configurable connector software client interface 282.

Configurable connector software 264 also has configurable connector software server interface 271, which is not used in this configuration. Client request 276 and server response 278 are OPC messages, which can be, convey between server application 280 and configurable connector software 264 when these software are on the same computer or when on two different computers connected by network 274.

Figure 8:
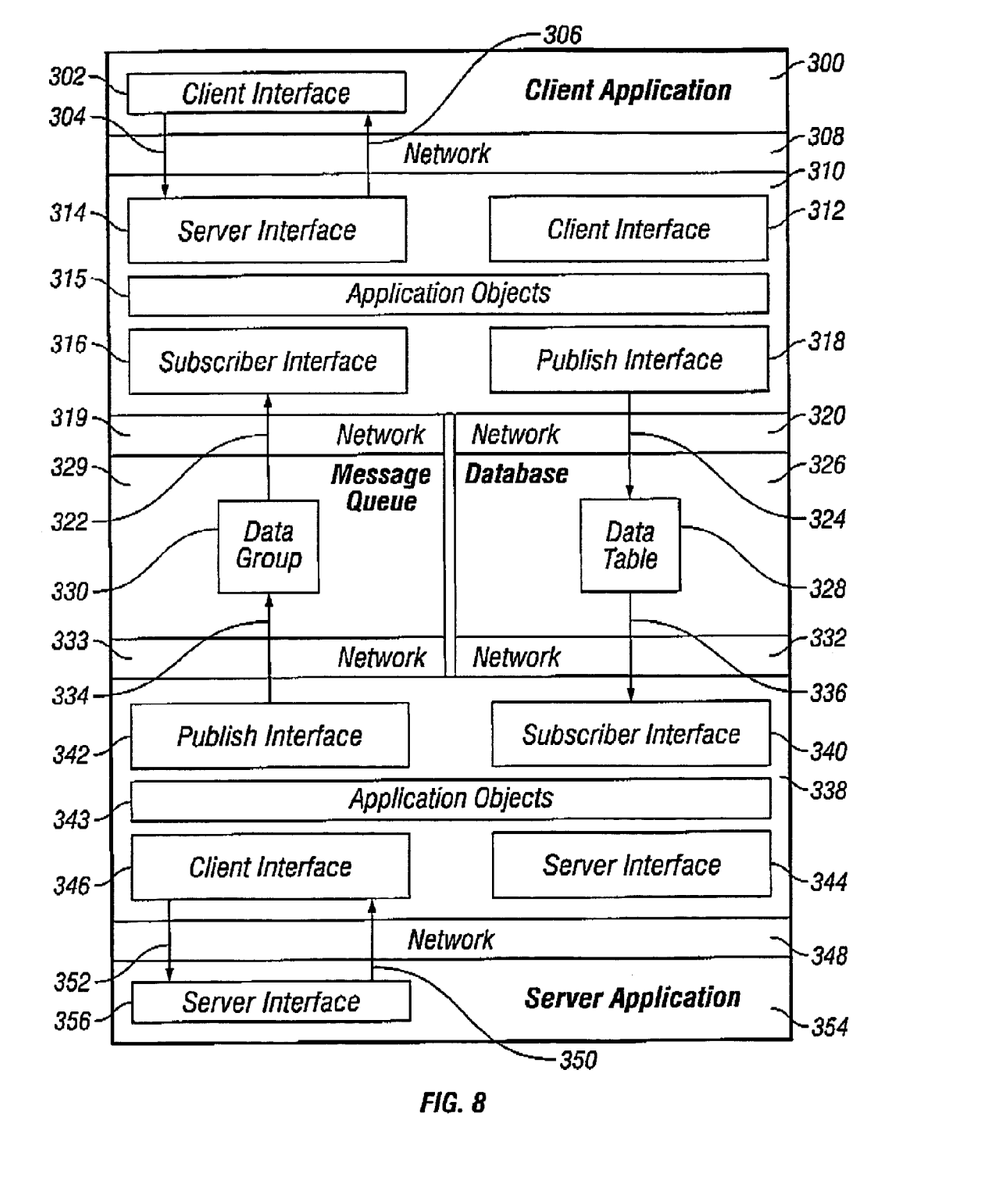
FIG. 8 shows an illustration of a client interface over a network to configurable connector software server interface on configurable connector software.

Referring to FIG. 8, there is shown an illustration wherein client application 300 sends client request 304 through client interface 302 over network 308 to configurable connector software server interface 314 on configurable connector software 310. Configurable connector software 310 sends server response 306 to client interface 302 on client application 300 through configurable connector software server interface 314. In addition, configurable connector software 310 converts client request 304 to publish message 324, which is sent from configurable connector software subscriber interface 318, via network 320, to data table 328 on database 326. Alternatively, configurable applications objects 315 on configurable connector software 310 processes client request 304 prior to publish message 324, which is then sent from configurable connector software subscriber interface 318, via network 320, to data table 328 on database 326. Subsequently, database 326 updates second configurable connector software 338 through subscriber message 336 that is conveyed to configurable connector software subscriber interface 340 over network 332. The second configurable connector software 338 converts subscriber message 336 to client request 352 for transmission from configurable connector software client interface 346 to server interface 356 on server application 354. Alternatively, configurable application objects 343 on the second configurable connector software 338 processes subscriber message 336 prior to client request 352 which is then transmitted from configurable connector software client interface 346 to server interface 356 on server application 354. Client request 352 and server response 350 are OPC messages that can be conveyed between server application 354 and the second configurable connector software 338 when these software are on the same computer or when on two different computers connected by network 348.

Server application 354 can respond to data coming from client application 300 through server response 350, which is sent from server interface 356 to configurable connector software client interface 346 on the second configurable connector software 338. The second configurable connector software 338 converts server response 350 to publish message 334 to be transmitted from configurable software publishing interface 342 to data group 330 on message queue 329 over global communication network 333. Alternatively, configurable application objects 343 on the second configurable connector software 338 processes server response 350 prior to publish message 334 which is then transmitted from configurable software publishing interface 342 to data group 330 on message queue 329 over global communication network 333. Subsequently configurable connector software 310 is updated by subscriber message 322 sent form data group 330 to configurable connector software subscriber interface 316 over global communication network 319. Configurable connector software 310 converts subscriber message 322 into server response 306, which is conveyed from configurable connector software server interface 314 to client interface 302 over network 308. Alternatively, configurable application objects 315 on configurable connector software 310 processes subscriber message 322 prior to server response 306, which is then conveyed from configurable connector software server interface 314 to client interface 302 over network 308.

In these applications configurable connector client interface 312 on configurable connector software 310 and configurable connector server interface 344 on the second configurable connector software 338 are available but not used.

Figure 9:
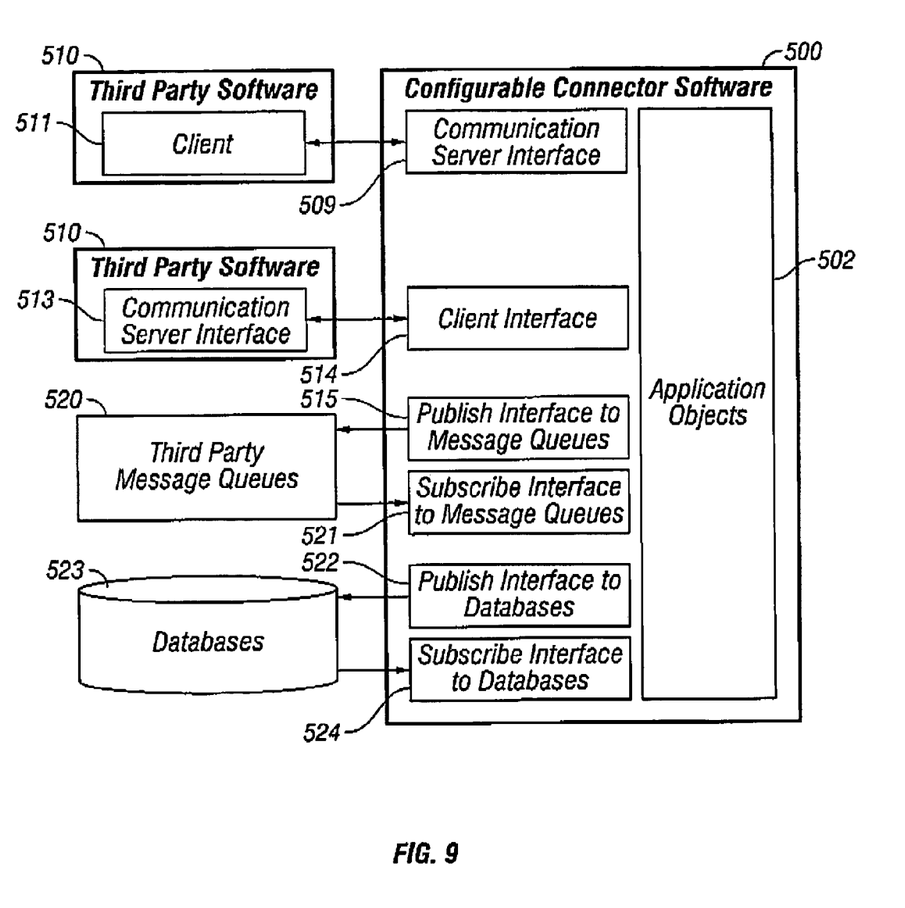
FIG. 9 illustrates different add-in modules that provide different transport and data processing capabilities.

FIG. 9 illustrates different add-in modules that provide different transport and data processing capabilities. FIG. 9 depicts a configurable connector software 500 in which add-in modules can be added or removed to provide different transport and data processing options. One module, communication server interface 509, supports bi-directional communication between the configurable connector software 500 and third party software 510 having a client interface 511 that adheres to the same transport standard, such as OPC. Similarly, the client interface 514 in configurable connector software 500 can communicate data bi-directionally with third party software 510 having a communication server interface 513, both of which adhere to a common transport standard such as OPC.

Other add-in modules provide additional transports to configurable connector software 500 (such as the publish interface) to message queues 515 and the subscribe interface to message queues 521. The publish interface to message queues 515 enables the configurable connector software 500 to transmit or publish data to third party message queues 520. Alternatively, the subscribe interface to message queues 521 enables the configurable connector software 500 to subscribe to receive data from third party message queues 520. Similarly, publish interface to databases 522 and subscribe interface to databases 524 enable data to be communicated between configurable connector software 500 and databases 523. Through the publish interface to databases 522, the configurable connector software 500 can write data or publish data to databases 523. Conversely, the subscribe interface to databases 524 can subscribe to receive data from databases 523.

Data that is received through any add-in transport module in configurable connector software 500 can be routed through the application objects 502 for calculations and data processing prior to retransmission through the same or other transports. For example, data can be received from third party software 510 via client interface 511 and communication server interface 509 and processed by application objects 502. Subsequently, the results of processing by application objects 502 can then be published to third party message queues 520 through publish interface to message queues 515 and can simultaneously be published to databases 523 through publish interface to databases 522.

Because data processing by application objects 502 is not always required, data could be received by a transport and sent to at least one other transport for retransmission without processing by application objects 502. As an example, data received from third party

The invention claimed is:

1. A connector software when executed connects on-line interfaces used in automation systems with transaction processing for distribution of data over a global communication network comprising:
   (a) configurable connector software means running in memory on at least one communication server of a computer;
   (b) configurable connector software communication server interface means in the at least one communication server adapted to receive at least one client request from at least one client application for data and for sending said data in a server response;
   (c) configurable connector software client interface means in the at least one communication server adapted to issue at least one client request to at least one communication server application for data and for receiving said data in the server response;
   (d) configurable connector software publishing interface means in the at least one communication server adapted to send data to a message queue;
   (e) configurable connector software subscriber interface means in the at least one communication server adapted to receive data from said message queue;
   (f) the configurable connector software publishing interface means in the at least one communication server is adapted to send data to at least one database;
   (g) the configurable connector software subscriber interface means in the at least one communication server is adapted to receive data from at least one database; and
   (h) a configurable application objects adapted to process said received data from the message queue and the database and to transmit the results of said processing.

2. The configurable connector software means of claim 1, wherein said database for said configurable connector software subscriber interface means and said database for said configurable connector software publishing interface means are different.

3. The configurable connector software means of claim 1, wherein data received from other client applications through said configurable connector software communication server interface means can be published to said database.

4. The configurable connector software means of claim 1, wherein data received from other communication server applications through said configurable connector software client interface means can be published to said database.

5. The configurable connector software means of claim 1, wherein data received from said message queue through said configurable connector software subscriber interface means can be published to said database.

6. The configurable connector software means of claim 1, wherein data received from said database through said configurable connector software-subscriber interface means can be published to said message queue.

7. The configurable connector software means of claim 1, wherein said configurable connector software means is adapted to publish data to the message queue on a trigger event that is a member of the group consisting of:
   (i) transactions triggered by an elapsed interval timer;
   (ii) transactions triggered when a data value received through the configurable connector software client interface means varies from a preset value;
   (iii) transactions triggered when a data value received through the configurable connector software communication server interface means and varies from a preset value;
   (iv) transactions that are interlocked to a second true logical comparison between a data value from the configurable connector software client interface means and a preset value; and
   (v) transactions that are interlocked to a second true logical comparison between a data value from the configurable connector software communication server interface means and a preset value.

8. The configurable connector software means of claim 1, wherein said configurable connector software means is adapted to publish data to the database on a trigger event that is a member of the group consisting of:
   (i) transactions triggered by an elapsed interval timer;
   (ii) transactions triggered when a data value received through the configurable connector software client interface means varies from a preset value;
   (iii) transactions triggered when a data value received through the configurable connector software communication server interface means and varies from a preset value;
   (iv) transactions that are interlocked to a second true logical comparison between a data value from the configurable connector software client interface means and a preset value; and
   (v) transactions that are interlocked to a second true logical comparison between a data value from the configurable connector software communication server interface means and a preset value.

9. The configurable connector software means of claim 1, wherein said configurable connector software means can subscribe to receive data from said message queue on a second computer over said global communication network, for transfer to client applications through said configurable connector software communication server interface means.

10. The configurable connector software means of claim 9, wherein said configurable connector software means is adapted to subscribe to and receive data updates from said message queue.

11. The configurable connector software means of claim 1, wherein said configurable connector software means can subscribe to receive data from said database for transfer to client applications through said configurable connector software communication server interface means.

12. The configurable connector software means of claim 11, wherein said configurable connector software means is adapted to subscribe to and receive data updates from said database.

13. The configurable connector software means of claim 1, wherein said configurable connector software means can subscribe to receive data from said message queue on a second computer over said global communication network, for transfer to communication server applications through said configurable connector software client interface means.

14. The configurable connector software means of claim 13, wherein said configurable connector software means is adapted to subscribe to and receive data updates from said message queue.

15. The configurable connector software means of claim 1, wherein said configurable connector software means can subscribe to receive data from said database for transfer to communication server applications through said configurable connector software client interface means.

16. The configurable connector software means of claim 15, wherein said configurable connector software means is adapted to subscribe to and receive data updates from said database.

17. The configurable connector software means of claim 1, wherein said computer is adaptable to run on a windows-based or NT-based operating system.

18. The configurable connector software means of claim 1, wherein said configurable connector software means is used to connect automation systems to a member of the group consisting of: a supervisory control and data acquisition (SCADA) system, a distributed control system (DCS), a controller, a data acquisition system and combinations thereof.

19. The configurable connector software means of claim 18, wherein said connection to said automation system is performed over said global communication network.

20. The configurable connector software means of claim 1, wherein said configurable connector software means has at least one configurable application object adapted to process data received through an interface that is a member of the group consisting of:
    (i) configurable connector software communication server interface means;
    (ii) configurable connector software client interface means;
    (iii) configurable connector software publish interface means; or
    (iv) configurable connector software subscriber interface means.

21. The configurable connector software means of claim 1, wherein said configurable connector software means has at least one configurable application object adapted to transmit processed data through an interface that is a member of the group consisting of:
    (i) configurable connector software communication server interface means;
    (ii) configurable connector software client interface means;
    (iii) configurable connector software publish interface means; and
    (iv) configurable connector software subscriber interface means.

22. The configurable connector software means of claim 1, wherein said configurable connector software means can be extended through the addition of configurable application objects.

23. The configurable connector software means of claim 22, wherein said configurable application objects are developed in a windows programming language or Visual Basic Scripting Language.

24. A method executed by a computer system for connecting automation hardware and software over a global communication network to other automation hardware and software comprising the steps of:
    (a) using connector software to request data through a client interface from external software with a communication server interface means which generates a response;
    (b) receiving the response from the communication server interface means and converting the response to a message;
    (c) publishing the message to a message queue on a trigger event selected from the group consisting of:
        (i) transactions triggered by an elapsed interval timer;
        (ii) transactions triggered when a data value received through the configurable connector software client interface means varies from a preset value;
        (iii) transactions triggered when a data value received through the configurable connector software server interface means and varies from a preset value;
        (iv) transactions that are interlocked to a second true logical comparison between a data value from the configurable connector software client interface means and a preset value; and
        (v) transactions that are interlocked to a second true logical comparison between a data value from the configurable connector software server interface means and a preset value.

25. A method executed by a computer system for connecting automation hardware and software over a global communication network to other automation hardware and software comprising the steps of:
    (a) using connector software receiving data through a communication server interface means from external software with a client interface which generates a data write;
    (b) receiving a response from the communication server interface means and converting the response to a message;
    (c) publishing the message to a message queue on a trigger event selected from the group consisting of:
        (i) transactions triggered by an elapsed interval timer;
        (ii) transactions triggered when a data value received through the configurable connector software client interface means varies from a preset value;
        (iii) transactions triggered when a data value received through the configurable connector software server interface means and varies from a preset value;
        (iv) transactions that are interlocked to a second true logical comparison between a data value from the configurable connector software client interface means and a preset value; and
        (v) transactions that are interlocked to a second true logical comparison between a data value from the configurable connector software server interface means and a preset value.

26. A system for connecting automation hardware and software over a global communication network to other automation hardware and software comprising:
    (a) a connector software to request data, wherein the connector software comprises:
        (i) configurable connector software means running in memory on at least one communication server of a computer;
        (ii) configurable connector software communication server interface means in the at least one communication server adapted to receive at least one client request from at least one client application for data and for sending said data in a server response;
        (iii) configurable connector software client interface means in the at least one communication server adapted to issue at least one client request to at least one communication server application for data and for receiving said data in the server response;

(iv) configurable connector software publishing interface means in the at least one communication server adapted to send data to a message queue, wherein the configurable connector software publishing interface means is adapted to send data to at least one database;

(v) configurable connector software subscriber interface means in the at least one communication server adapted to receive data from said message queue, wherein the configurable connector software subscriber interface means is adapted to receive data from said at least one database; and (vi) a configurable application objects adapted to process said received data from the message queue and the database and to transmit the results of said processing;

(b) a communication server interface means for generating a response to a request from the configurable connector software interface means; and (c) a message queue to receive data from the configurable connector software publishing interface means in and to send data to the configurable connector software subscriber interface means.

27. The system of claim 26, wherein said configurable connector software means is adapted to publish data to the message queue on a trigger event that is a member selected from the group consisting of:

(A) transactions triggered by an elapsed interval timer;

(B) transactions triggered when a data value received through the configurable connector software client interface means varies from a preset value;

(C) transactions triggered when a data value received through the configurable connector software communication server interface means and varies from a preset value;

(D) transactions that are interlocked to a second true logical comparison between a data value from the configurable connector software client interface means and a preset value; and (E) transactions that are interlocked to a second true logical comparison between a data value from the configurable connector software communication server interface means and a preset value.

28. The system of claim 26, wherein said configurable connector software means is adapted to publish data to the database on a trigger event that is a member selected from the group consisting of:

(A) transactions triggered by an elapsed interval timer;

(B) transactions triggered when a data value received through the configurable connector software client interface means varies from a preset value;

(C) transactions triggered when a data value received through the configurable connector software communication server interface means and varies from a preset value;

(D) transactions that are interlocked to a second true logical comparison between a data value from the configurable connector software client interface means and a preset value; and (E) transactions that are interlocked to a second true logical comparison between a data value from the configurable connector software communication server interface means and a preset value.

29. The system of claim 26, wherein said configurable connector software means subscribes to receive data from said message queue on a second computer over said global communication network, for transfer to client applications through said configurable connector software communication server interface means.

30. The system of claim 26, wherein said configurable connector software means subscribes to receive data from said database for transfer to client applications through said configurable connector software communication server interface means.

31. The system of claim 26, wherein said configurable connector software means subscribes to receive data from said message queue on a second computer over said global communication network, for transfer to communication server applications through said configurable connector software client interface means.

32. The system of claim 26, wherein said configurable connector software means subscribes to receive data from said database for transfer to communication server applications through said configurable connector software client interface means.

33. The system of claim 26, wherein said computer is adaptable to run on a windows-based or NT-based operating system.

34. The system of claim 26, wherein said configurable connector software means is used to connect automation systems to a member of the group consisting of: a supervisory control and data acquisition (SCADA) system, a distributed control system (DCS), a controller, a data acquisition system and combinations thereof.

35. The system of claim 26, wherein said configurable connector software means has at least one configurable application object adapted to process data received through an interface that is a member of the group consisting of:

(A) configurable connector software communication server interface means;

(B) configurable connector software client interface means;

(C) configurable connector software publish interface means; or (D) configurable connector software subscriber interface means.

36. The system of claim 26, wherein said configurable connector software means has at least one configurable application object adapted to transmit processed data through an interface that is a member of the group consisting of:

(A) configurable connector software communication server interface means;

(B) configurable connector software client interface means;

(C) configurable connector software publish interface means; or (D) configurable connector software subscriber interface means.

37. The system of claim 26, wherein said configurable application objects are developed in a windows programming language or Visual Basic Scripting Language.

* * * * *